United States Patent
Greene et al.

(10) Patent No.: US 8,434,258 B2
(45) Date of Patent: May 7, 2013

(54) LURE SKIRT

(76) Inventors: Daryl W. Greene, Pawleys Island, SC (US); Van Troung, Huyen Cu Chi (VN)

( * ) Notice: Subject to any disclaimer, the term of this patent is extended or adjusted under 35 U.S.C. 154(b) by 564 days.

(21) Appl. No.: 12/807,098

(22) Filed: Aug. 27, 2010

(65) Prior Publication Data

US 2010/0325936 A1 Dec. 30, 2010

Related U.S. Application Data (63) Continuation of application No. 11/245,395, filed on Oct. 6, 2005, now Pat. No. 7,805, 880.

(60) Provisional application No. 60/650,784, filed on Feb. 8, 2005.

(51) Int. Cl.
*A01K 85/00* (2006.01)

(52) U.S. Cl.
USPC .................................. 43/42.53; 43/42.28

(58) Field of Classification Search ............ 43/42.1, 43/42.24–42.26, 42.28, 42.53
See application file for complete search history.

(56) References Cited

U.S. PATENT DOCUMENTS

| | | | | |
|---|---|---|---|---|
| 4,163,337 A * | 8/1979 | Kress | | 43/42.5 |
| 4,689,914 A * | 9/1987 | Quinlan | | 43/42.22 |
| 4,914,851 A * | 4/1990 | Acker | | 43/42.41 |
| 5,113,607 A * | 5/1992 | Pate | | 43/42.28 |
| 5,155,948 A * | 10/1992 | Kitagawa | | 43/42.36 |
| 5,167,089 A * | 12/1992 | Schriefer | | 43/42.36 |
| 5,207,016 A * | 5/1993 | Pate | | 43/42.28 |
| 5,251,395 A * | 10/1993 | Wicklund | | 43/42.25 |
| 5,261,182 A * | 11/1993 | Link | | 43/42.36 |
| 5,491,927 A * | 2/1996 | Ortiz | | 43/42.28 |
| 5,709,047 A * | 1/1998 | Link | | 43/42.31 |
| 5,899,015 A * | 5/1999 | Link | | 43/42.39 |
| 6,199,312 B1 * | 3/2001 | Link | | 43/42.24 |
| 6,357,167 B1 * | 3/2002 | Bradford | | 43/42.09 |
| 6,598,336 B2 * | 7/2003 | Link | | 43/42.28 |
| 7,647,722 B2 * | 1/2010 | Shelton et al. | | 43/42.53 |

* cited by examiner

*Primary Examiner* — Kimberly Berona
(74) *Attorney, Agent, or Firm* — J. Bennett Mullinax, LLC (57) ABSTRACT

A lure skirt which comprises a two piece central unit of a first component of a first collar and a raised male hub where the raised male hub has an orifice at its center and a second component of a second collar and a raised female hub where the raised female hub has an orifice at its center and is sized to accept the male hub. Multiple individual strands or multiple block strands are secured to either the first collar or the second collar or both the first and second collars by an adhesive. The male hub is affixed inside said female hub and multiple strands radiate out from the central unit.

14 Claims, 7 Drawing Sheets

LURE SKIRT

RELATED CASES

This application is a continuation application of U.S. patent application Ser. No. 11/245,395 that was filed on Oct. 6, 2005, and is now U.S. Pat. No. 7,805,880. U.S. Pat. No. 7,805,880 claims the priority of the Provisional Application Ser. No. 60/650,784 filed Feb. 8, 2005.

BACKGROUND OF THE INVENTION

The present invention provides a bait skirt which helps camouflage the hook on the fishing lure.

Whether a lure is sinking or floating, its purpose is to attract the attention of the fish by simulating the look and movement of their natural prey. The idea is to have the fish react to the lure as if it is food or a threat within its territory. To this end the lure skirt has been developed over the years for a variety of fishing lures. In both fresh-water and salt water applications skirts are used to enhance and exaggerate lure movements. Skirts are also used to camouflage the hook in the lure. It is also believed that colored skirts attract attention or agitate the fish or exaggerate the movement of the lure.

SUMMARY OF THE INVENTION

A lure skirt which comprises a two piece central unit having a first component of a first collar and a raised male hub where the raised male hub has an orifice at its center and a second component of a second collar and a raised female hub where the raised female hub has an orifice at its center and is sized to accept the male hub. A plurality of strands of silicone, are provided and are secured to a surface where the surface is selected from the group of the first collar, the second collar, or both the first collar and the second collar; by an adhesive. The plurality of strands is selected from the group consisting of: multiple individual strands, multiple block strands or a combination of multiple individual strands and multiple block strands. The male hub is then affixed inside said female hub and plurality of strands radiate out from the central unit.

Also disclosed is a method of producing a lure skirt which is comprised of the steps of providing a first component which has a first collar and a raised male hub where the raised male hub has an orifice at its center and a second component having a second collar and a raised female hub where the raised female hub has an orifice at its center and is sized to accept the male hub. Next an adhesive is applied either: manually, mechanically or robotically around a surface where the surface is selected from the group of: the first collar, the second collar, or both the first collar and the second collar. Pluralities of strands are provided and are positioned either: manually, mechanically or robotically in contact with the adhesive. Where the plurality of strands is selected from the group consisting of: multiple individual strands, multiple block strands or a combinations of multiple individual strands and multiple block strands. Then the raised male hub is inserted inside the raised female hub to form the lure skirt.

BRIEF DESCRIPTION OF THE DRAWINGS

The foregoing will become more readily apparent by referring to the following detailed description and the appended drawings in which.

DETAILED DESCRIPTION OF THE INVENTION

Figure 1:
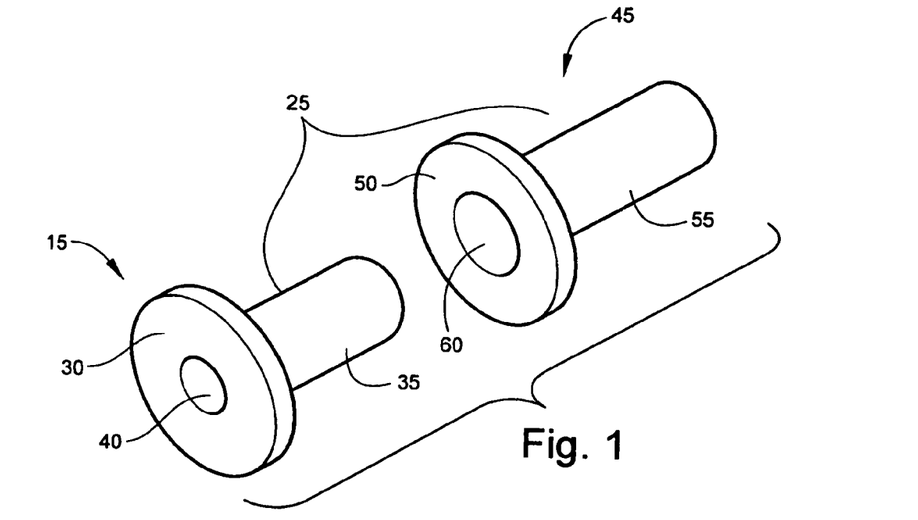
FIG. 1 is a perspective view of the first component and second component of the central unit.
Figure 2:
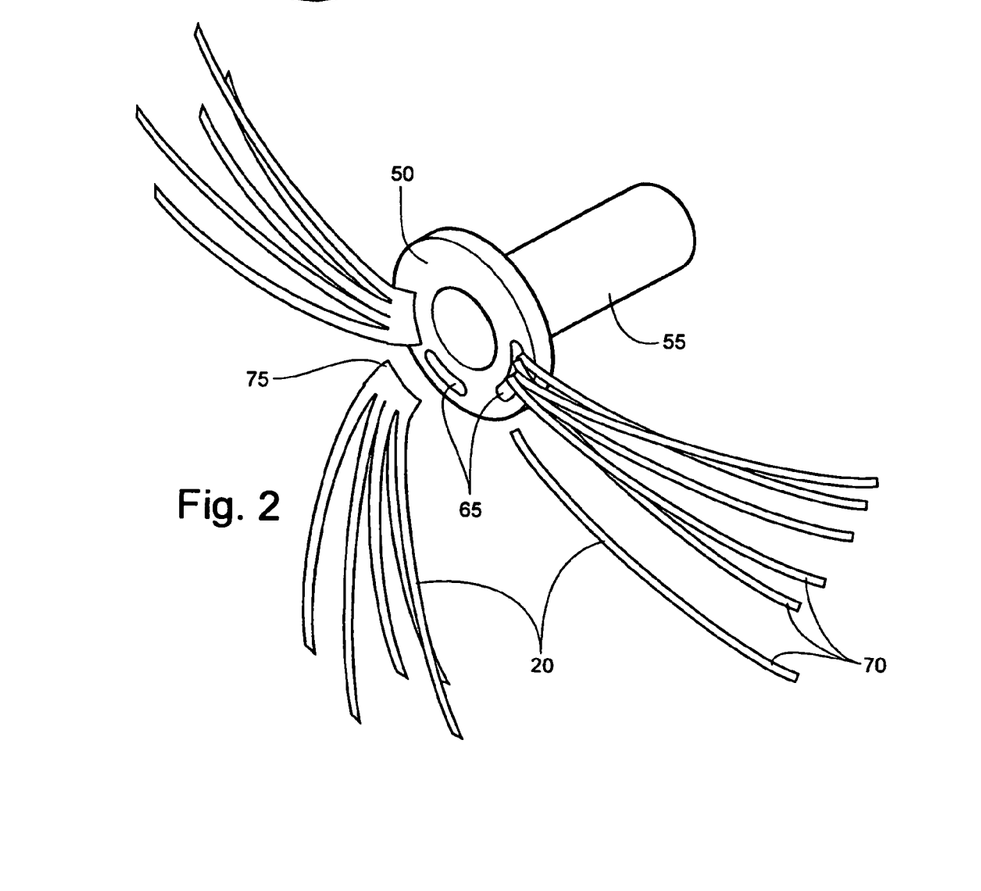
FIG. 2 is a perspective view of the second component of the central unit shown with strands being attached.
Figure 6:
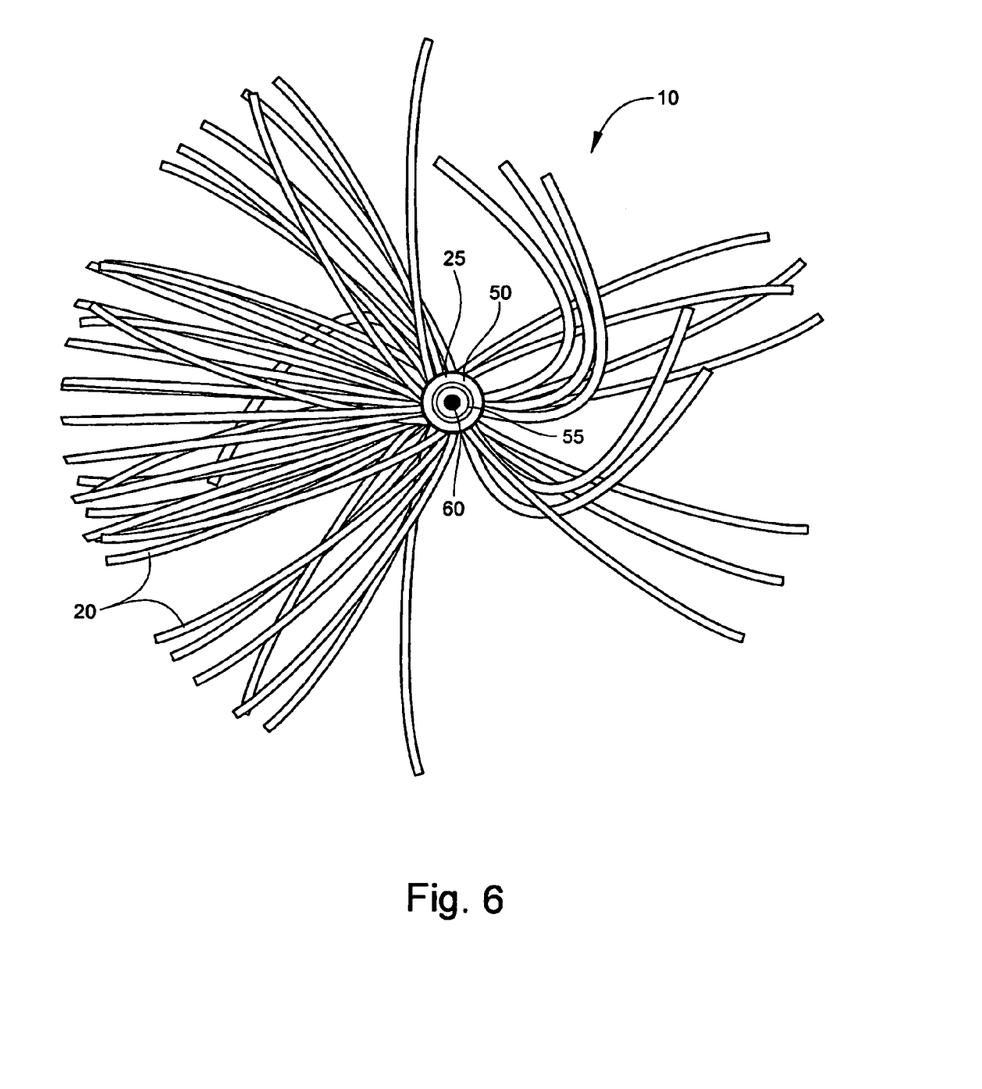
FIG. 6 is a top view of the shirt with the central unit and strands.

A lure skirt 10, FIG. 6, which comprises a two piece central unit 25, having a first component 15, FIG. 1, of a first collar 30 and a raised male hub 35 where the raised male hub 35 has an orifice 40 at its center and a second component 45 of a second collar 50 and a raised female hub 55 where the raised female hub has an orifice 60 at its center and is sized to accept the male hub. A plurality of strands 20, FIG. 2 are provided and are secured to a surface where the surface is selected from the group of: the first collar 30, the second collar 50, or both the first collar 30 and the second collar 50; by an adhesive 65. The plurality of strands 20 is selected from the group consisting of: multiple individual strands 70, multiple block strands 75 or a combination of multiple individual strands and multiple block strands. The male hub 35 is then affixed inside said female hub 55 and plurality of strands radiate out from the central unit 25.

The lure skirt uses an adhesive 65 to bond the strands 20 to the central hub 25. While any type of adhesive can be used it has been found that a RTV (room temperature vulcanizing) adhesive works well in this application. RTV adhesives are available from G.E., Dow-Corning and Loctite. Sufficient adhesive is applied either: manually, mechanically or robotically, to the surface so that all the strands may be attached either: manually, mechanically or robotically. It is also possible that a first band of adhesive is applied either manually, mechanically or robotically, the plurality of strands are attached either: manually, mechanically or robotically, then a subsequent band of adhesive is applied either: manually, mechanically or robotically, over the tops of the stands affixed to the surface, so even more bands may be attached either: manually, mechanically or robotically.

If the skirt components are made from silicon then the adhesive used must be capable of binding silicon parts together. Other types of adhesives are RT heat cured adhesive, or a silicon gum which includes a curing means selected from peroxide or platinum catalyst. The silicon gum would be somewhat tacky and can be cured by two mechanisms, the first a free radical cure using a peroxide catalyst or additional cure using a noble metal such as platinum.

The multiple strands 20 of the lure skirt 10 may have a color component which can be incorporated directly into the strands 20. These strands 20 may incorporate a color additive, or colorant, which is selected from the group consisting of pigment, dye, color, glitter, mica, or combinations thereof. It is also possible for the colorant to be applied to the surface of the strands by a spray, printing or direct application method such as by brush or roller.

The lure skirt 10 may also have another color component which can be incorporated directly into the central unit 25. Here either the first component 15 or the second component 45 or both the first and second component 15, 45, of the central unit 25 may have a color component incorporated into the central unit by a colorant put directly into or onto the surface either the first or the second component or both the first and second component of the central unit, which is selected from the group consisting of pigment, dye, color, glitter, mica, or combinations thereof.

Figure 8:
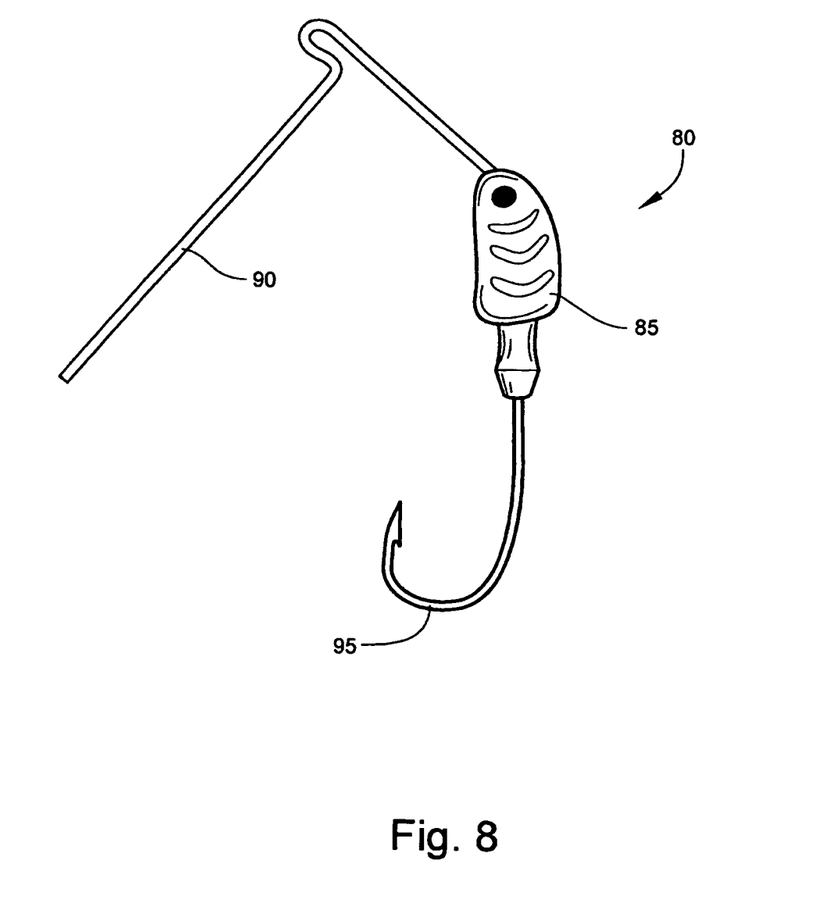
FIG. 8 is a perspective view of a spinner lure hook having an integral head shaped lead sinker.

In operation the lure skirt 10 may be adapted for engagement with a variety of fishing lure body components such as the lure hook 80, FIG. 8, having an integral head shaped lead sinker 85, a line attachment point 90 and a hook 95. The central unit 25 of the lure skirt 10, is engaged over the hook 95, FIG. 9, and over the skirt hub 100 of the integral head shaped lead sinker 85.

Figures 3, 4, 7:
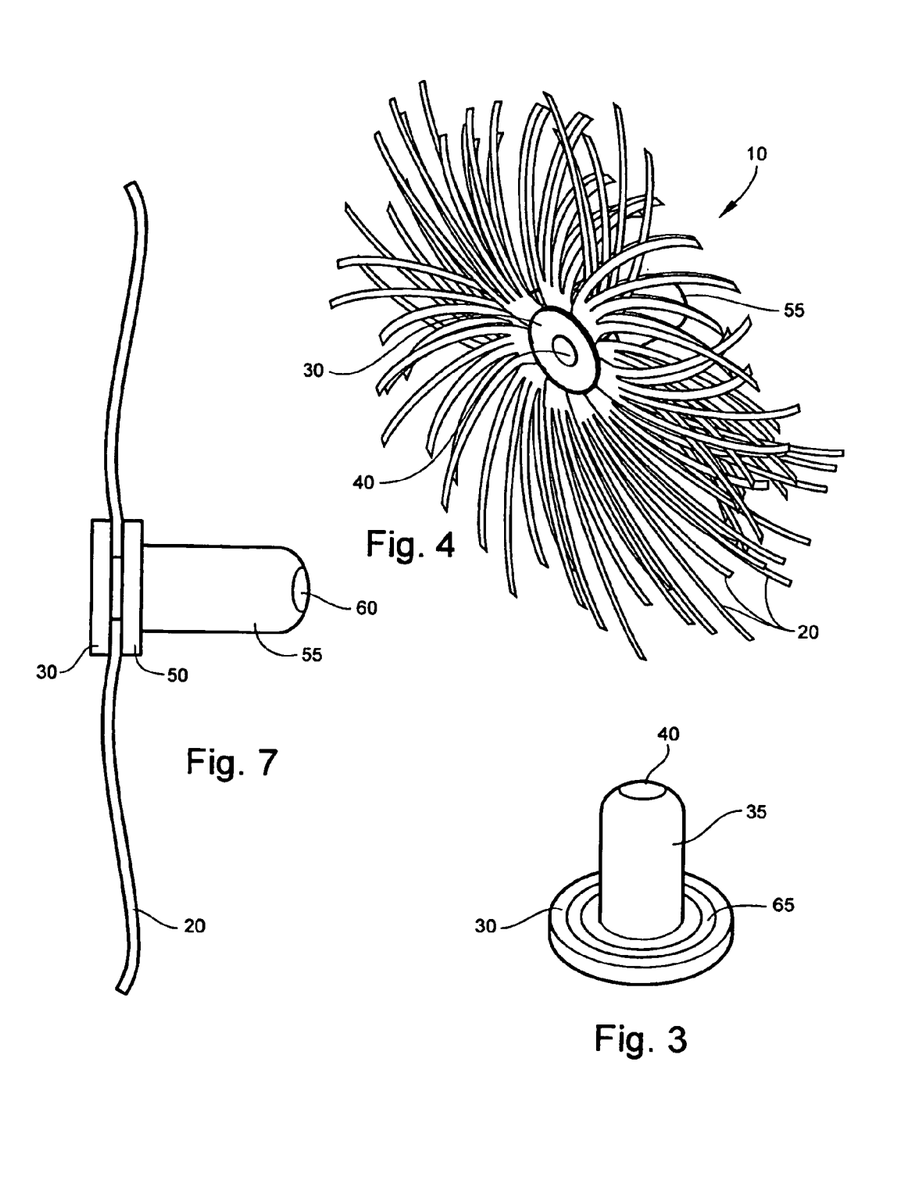
FIG. 3 is a perspective view of the first component of the central unit shown with a band of adhesive applied to the first collar
FIG. 4 is a perspective view of the first component and second component of the central unit where the second component is shown with the strands attached.
FIG. 7 is a side view of the shirt with the central unit with strands only shown at the top and bottom of the central unit.

The orifice 40 on the first component 15, FIG. 1, is connected to orifice 40, of the raised male hub 35, FIG. 3, by a hollow channel. The orifice 60 on the second component 45, FIG. 1 is connected to the orifice 60 in the raised female hub 55, FIG. 1, by a hollow channel. These hollow channels are configured to journal the hook 95 or the skirt hub 100 which will facilitate the engagement and disengagement of the lure skirt 10 on the hook 95 or the skirt hub 100. The skirt 10 may cover some of the hook 95; it may also cover the entire hook 95, or none of the hook 95.

While the raised male hub 35, FIG. 3, and the raised female hub 55, FIG. 7, are shown to extend from the collar a distance, the distance which the hub extends may also be longer or shorter. A hub that only extends slightly from the collar would also work well and have the added advantage of being easily engaged and disengaged from the hook 95 or the skirt hub 100.

In one embodiment the fishing lure bait component, or a skirt 10, FIG. 6, which comprises a central unit 25 having an orifice and a plurality of flexible strings 20 attached to said central unit 25. The central unit 25 is a two piece unit further comprising a first component 15 of a first collar 30 and a raised male hub 35 where the raised male hub 35 has an orifice 40 at its center and a second component 45 of a second collar 50 and a raised female hub 55 where the raised female hub 55 has an orifice 60 at its center and is sized to accept the male hub 35. The plurality of strands 20 are secured to a surface by an adhesive 65 where the surface is selected from the group consisting of: said first collar 30, said second collar 50, or both said first collar 30 and said second collar 50. In one embodiment there is enough adhesive 65 supplied in affixing the strands to the collar that when the first component is inserted into the second component that the excess adhesive bonds the first component to the second component.

In one of the embodiments of the present invention the fishing lure bait component's plurality of flexible strings 20 are attached to the first collar 30, FIG. 3, with a ring of adhesive 65 and are further secured by the female or second collar 50 as shown in FIG. 7.

In one of the embodiments of the present invention the fishing lure bait component's plurality of flexible strings 20 are attached to the second collar 50 and are further secured by the first collar 30 with an RTV (room temperature vulcanizing) bonding compound or adhesive and compression.

Figure 9:
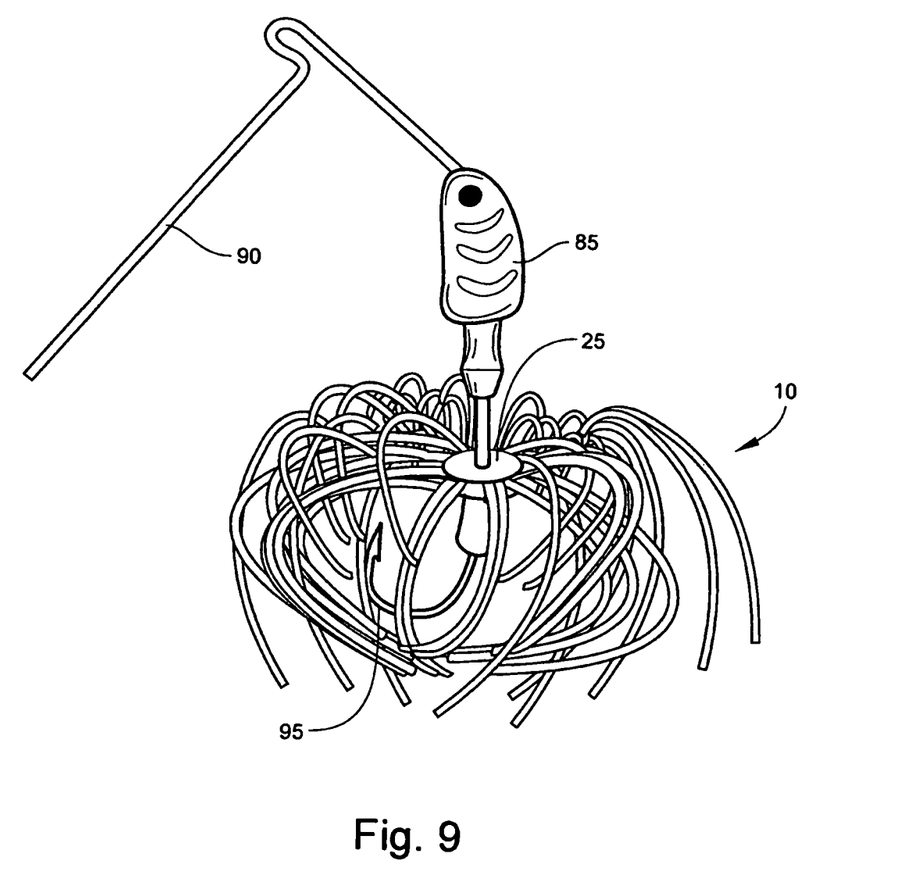
FIG. 9 is a perspective view of the skirt going on the spinner lure hook having an integral head shaped lead sinker.
Figure 10:
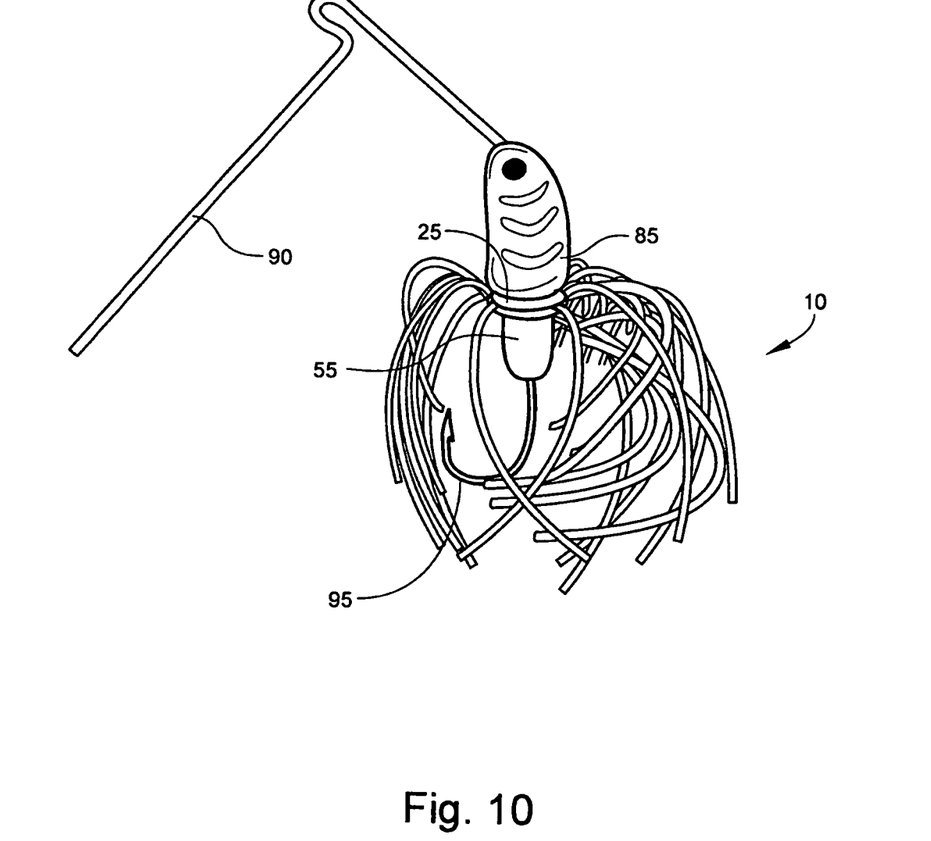
FIG. 10 is a perspective view of the skirt on the spinner lure hook having an integral head shaped lead sinker.

In one of the embodiments of the present invention the lure skirt's orifices 40 and 60 are adapted for engagement with a spinner lure hook 80, FIG. 8 having an integral head shaped lead sinker 85. When the skirt 10 is put together, the male hub 35 is slid into orifice 60, leaving only one orifice 40, in the final skirt 10, this orifice 40 runs from the first collar 30 to the raised female hub 55, which provides an elongated channel. The orifice 40 is configured so that it will journal either the hook 95 or the skirt hub 100 of a spinner lure hook 80. This lure hook, has a hook end 95 below the integral head shaped lead sinker 85 and a line end 90 above the integral head shaped lead sinker 85. The lure skirt's central unit 25 is slid over the hook end 95 and engaged at a point just below the integral head shaped lead sinker 85, which is the skirt hub 100, as shown in FIG. 9. When fully inserted the skirt 10 fits onto the skirt hub 100 just below the integral head shaped lead sinker 85 as shown in FIG. 10.

Figure 5:
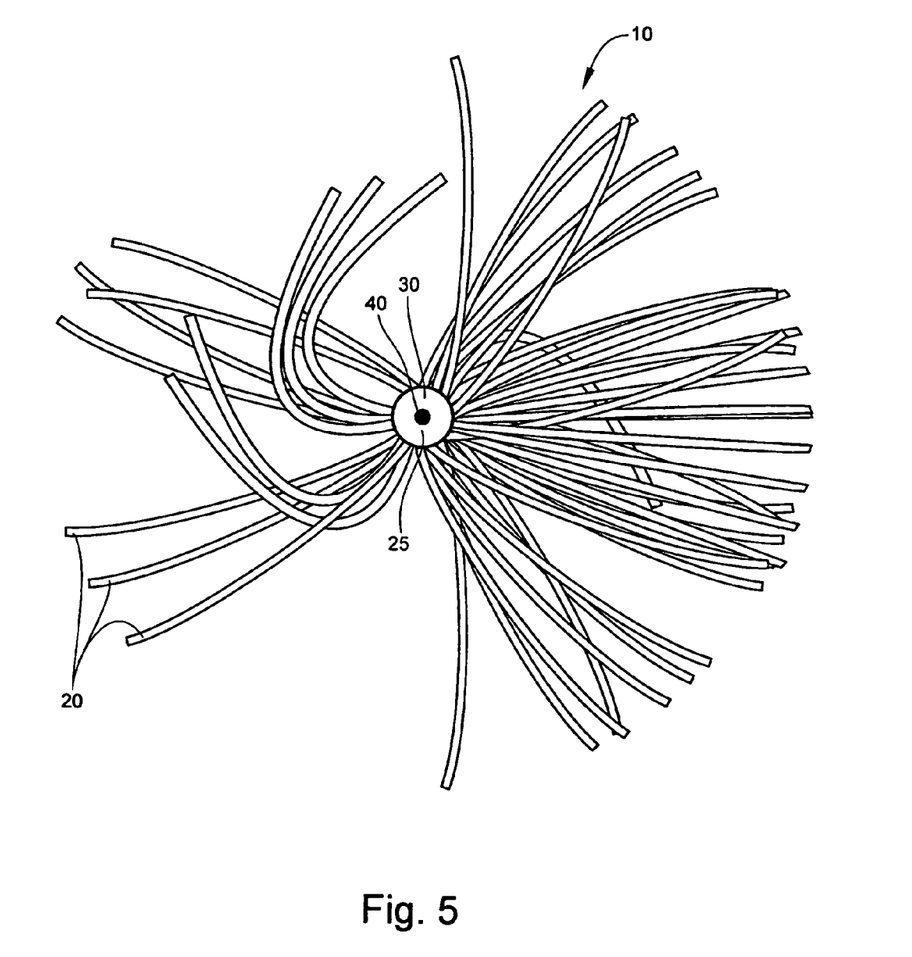
FIG. 5 is a bottom view of the shirt with the central unit and strands.

In one of the embodiments of the present invention the lure skirt 10, FIG. 5, is assembled by cutting a sheet of an elastomeric polymer material. This elastomeric polymer can be rubber, urethane, silicone or any similar elastomeric polymer. In one embodiment a 5¾"×12" silicone sheets are compression molded, then the sheets are then dye cut into strands 20, FIG. 2. As explained above the strands can be either multiple individual strands 70 or a block cut 75 which has a first end having a unified section 105, FIG. 2, and a second end being comprised of a plurality of individual strands 20. This block cut reduces the total number of individual pieces that must be secured to either the first collar 30 or second collar 50. A flexible elastomeric polymer female collar 50 and raised female hub 55 are molded, which is the second component 45. The second component 45 is placed on a jig and multiple individual strands 70 or block strands 75 are individually placed on the second collar 50 using an adhesive 65 to adhere the strands 20 to the second collar 50. Placement of the individual strands or block strands 75 may be done either manually, mechanically or robotically. Strands 20 may be of the same color or varied in color. The number of strands may vary. A flexible elastomeric polymer first component 15 is molded. This first component 15 has a first collar 30 and a raised male hub 35. The flexible elastomeric first component 15 is pressed into the second component 45 where the second component 45 has the strands 20 attached, thereby trapping the flexible elastomeric polymer strands 20 and adhesive 65 between the first collar 30 and the second collar 50, as shown in FIG. 7. The assemble skirt 10, FIG. 4, is now ready for cure. There are several was that cure can be accomplished, the assembled skirt may be sent through a curing oven to cure the adhesive 65 and promote the adhesion between the strands, adhesive, the first collar 30, and the second collar 50. Or the skirt might be set out at room temperature, defined to be between from 20 to 25° C. for a period of time long enough to effectuate cure. If the skirt is manufacture in a region where the ambient temperatures regularly exceed the definition of room temperature, in excess of 25° C., then leaving the skirts out in this environment will also effectuate cure.

The first component 15 and second component 45 of the central unit 25 of the skirt assembly are made from an elastomeric polymer. This elastomeric polymer may be rubber, urethane, silicone or any similar elastomeric polymer or combinations thereof. Both the first component 15 and second component 45 of the central unit 25 of the skirt assembly can be made by any method such as by an injection molding process, transfer molding process or a compression molding process.

In one of the embodiments of the invention, the method of producing the lure skirt 10 further comprises the step of laying an adhesive, which may be done either manually, mechanically or robotically, over the multiple strands 70, FIG. 2, or multiple block strands 75 or a combinations of multiple strands 70 and multiple block strands 75 prior to the insertion of the raised male hub 35 inside the raised female hub 55 to form the lure skirt.

In one of the embodiments of the invention, the central unit 25 has a raised male hub 35 which also has an inside surface and an outside surface and where the raised female hub 55 has an inside surface and an outside surface. This method further comprises the step of laying an adhesive 65 over either the outside surface of the male hub 35 or the inside surface of the female hub 55 or both the inside surface of the female hub 55 and the outside surface of the male hub 35 prior to the insertion of the raised male hub 35 inside the raised female hub 55 where the outside surface of the male hub 35 is against said inside surface of said female hub 55 to form said lure skirt.

In one of the embodiments of the invention, the method of producing a lure skirt further comprises the step of providing a jig and laying the formed skirt in said jig and allowing the adhesive to dry. The jig can be any device that helps to bind the first component 15 to the second component 45. The jig can either be a device design specifically for this task or it can be a small vice, a binder clip, clamp, alligator clip, which can be applied around the collars to secure first collar 30 to the second collar 50.

In one of the embodiments of the invention, the method of producing a lure skirt comprises the steps of providing a heat source; and subjecting the formed skirt to the heat source allowing the adhesive to dry. The heat source may be an oven or a drier or any other means for radiating heat over the formed skirt. Other sources may include laying the skirts out under the sun or leaving them out where the ambient temperature is more than 20° C. for a time period long enough to effectuate cure.

In one of the embodiments of the invention, the method of producing a lure skirt 10 where the raised male hub 35 has an inside surface and an outside surface and where said raised female hub 55 has an inside surface and an outside surface where in the insertion of said raised male hub 35 inside said raised female hub 55 the outside surface of the male hub 35 is against the inside surface of the female hub 55 to form said lure skirt.

In one of the embodiments of the invention, the method of producing a lure skirt 10 further comprises the step of compressing the first collar 30 and the second collar 50 and the male hub 35 to the female hub 55 after the insertion of the raised male hub 35 inside the raised female hub 55 to form said lure skirt 10. This compression may be done by hand or by inserting the lure skirt into a jig and allowing the jig to exert a compression force between the first collar and the second collar and the male hub and the female hub.

In one of the embodiments of the invention, the method of producing a lure skirt 10 further comprises the steps of: providing a jig, laying the formed skirt 10 in the jig, providing a heat source and subjecting the formed skirt to the heat source allowing the adhesive to dry.

What is claimed is:

1. A lure skirt comprising:
   a two piece central unit comprised a first component of a first collar and a raised male hub where said raised male hub has an orifice at its center and a second component of a second collar and a raised female hub where said raised female hub has an orifice at its center and is sized to accept said male hub, wherein said orifice of said female hub has a longitudinal axis that extends through a center of said orifice of said female hub;
   a plurality of strands where said plurality of strands is selected from the group consisting of: multiple individual strands, multiple block strands or a combination of multiple individual strands and multiple block strands; are secured to a surface where said surface is selected from the group consisting of: said first collar, said second collar, or both said first collar and said second collar; by an adhesive, wherein the portions of said plurality of strands that are secured by said adhesive extend only in a radial direction with respect to said longitudinal axis and not in a longitudinal direction with respect to said longitudinal axis; and
   where said male hub is affixed inside said female hub and multiple strands radiate out from said central unit.

2. The lure skirt according to claim 1 where said adhesive is selected from the group of: a room temperature vulcanizing (RTV) adhesive; an RT adhesive with a heat cure; silicon gum with a peroxide cure means; a silicon gum with a catalyst cure means, or a combination thereof.

3. The lure skirt according to claim 1 where multiple strands have a color component supplied by a colorant selected from the group consisting of: pigment, dye, color, glitter, mica, or combinations thereof.

4. The lure skirt according to claim 1 where said first component has a color component supplied by a colorant selected from the group consisting of: pigment, dye, color, glitter, mica, or combinations thereof.

5. The lure skirt according to claim 1 where said second component has a color component supplied by a colorant selected from the group consisting of: pigment, dye, color, glitter, mica, or combinations thereof.

6. The lure skirt according to claim 1 where said orifice is adapted for engagement with a lure body component hook having an integral head shaped lead sinker so that the central unit is engaged over the hook but below the integral head shaped lead sinker.

7. A method of producing a lure skirt comprising the steps of:
   providing a first component of a first collar and a raised male hub where said raised male hub has an orifice at its center and a second component of a second collar and a raised female hub where said raised female hub has an orifice at its center and is sized to accept said male hub, wherein said orifice of said female hub has a longitudinal axis that extends through a center of said orifice of said female hub;
   laying an adhesive around a surface where said surface is selected from the group consisting of: said first collar, said second collar, or both said first collar and said second collar;
   laying a plurality of strands where said plurality of strands is selected from the group consisting of: multiple individual strands, multiple block strands or a combinations of multiple individual strands and multiple block strands; atop said adhesive; and
   inserting said raised male hub inside said raised female hub to form said lure skirt where the step of laying may be performed either: manually, mechanically or robotically, wherein the portions of said plurality of strands that are laid atop said adhesive extend only in a radial direction with respect to said longitudinal axis and not in a longitudinal direction with respect to said longitudinal axis.

8. The method of producing a lure skirt according to claim 7 further comprising the step of:
   laying an adhesive over the multiple strands or multiple block strands or a combination of multiple strands and multiple block strands prior to the insertion of said raised male hub inside said raised female hub to form said lure skirt, where the step of laying may be performed either: manually, mechanically or robotically.

9. The method of producing a lure skirt according to claim 7 where said raised male hub has an inside surface and an outside surface and where said raised female hub has an inside surface and an outside surface further comprising the step of:

laying an adhesive over either said outside surface of said male hub or said inside surface of said female hub or both said inside surface of said female hub and said outside surface of said male hub prior to the insertion of said raised male hub inside said raised female hub where said outside surface of the male hub is against said inside surface of said female hub to form said lure skirt, where the step of laying may be performed either: manually, mechanically or robotically.

10. The method of producing a lure skirt according to claim 7 further comprising the step of:

providing a jig; and laying said formed skirt in said jig and allowing the adhesive to dry, where the step of laying may be performed either: manually, mechanically or robotically.

11. The method of producing a lure skirt according to claim 7 further comprising the step of:

providing a heat source; and subjecting said formed skirt to said heat source allowing the adhesive to dry.

12. The method of producing a lure skirt according to claim 7 where said raised male hub has an inside surface and an outside surface and where said raised female hub has an inside surface and an outside surface where in the insertion of said raised male hub inside said raised female hub said outside surface of said male hub is against said inside surface of said female hub to form said lure skirt.

13. The method of producing a lure skirt according to claim 7 further comprising the step of:

compressing said first collar and said second collar and said male hub to said female hub after the insertion of said raised male hub inside said raised female hub to form said lure skirt.

14. The method of producing a lure skirt according to claim 13 further comprising the step of:

providing a jig;

laying said formed skirt in said jig;

providing a heat source; and subjecting said formed skirt to said heat source allowing the adhesive to dry.

* * * * *